INVENTOR.
U. W. Groenendal

United States Patent Office 2,717,084
Patented Sept. 6, 1955

2,717,084
BICYCLE STAND

Ubbo Wilhelm Groenendal, Zurich, Switzerland

Application December 27, 1950, Serial No. 202,871

Claims priority, application Switzerland
December 28, 1949

3 Claims. (Cl. 211—20)

The invention relates to an improved bicycle stand consisting of a block of concrete or similar material supplied with a vertical slit to receive a part of a wheel and thereby holding the bicycle in a vertical position. The hitherto known bicycle stands of the type described have a slit with a curved base and the tire of a bicycle wheel of corresponding size fits the said slit accurately. However, if dirt or grit has filled up part of the slit or more particularly accumulated at the bottom of the slit, the wheel is no longer supported firmly in the stand. Furthermore, as the segment of the wheel introduced into the said slit is brought at all points of the tire into close contact with the walls of the slit the placement and the removal of the bicycle in or from the stand both require the application of some considerable force. On the other hand, if the size of the wheel does not substantially correspond to that of the slit in the block the stand fails to firmly support the bicycle.

The object of the present invention is to provide a bicycle stand free of the described disadvantages.

In the bicycle stand according to the invention the slit extends through the block with substantially parallel side walls and tapered ends. Furthermore, in the longitudinal centre of the slit the opposite walls of the same are provided with ribs which taper out towards the upper surface of the block in such manner that the wheel placed into the slit is clamped only between the central ribs and between the narrower ends of the slit.

In the annexed drawing a preferred embodiment of the improved bicycle stand according to the invention is shown.

Figure 1:
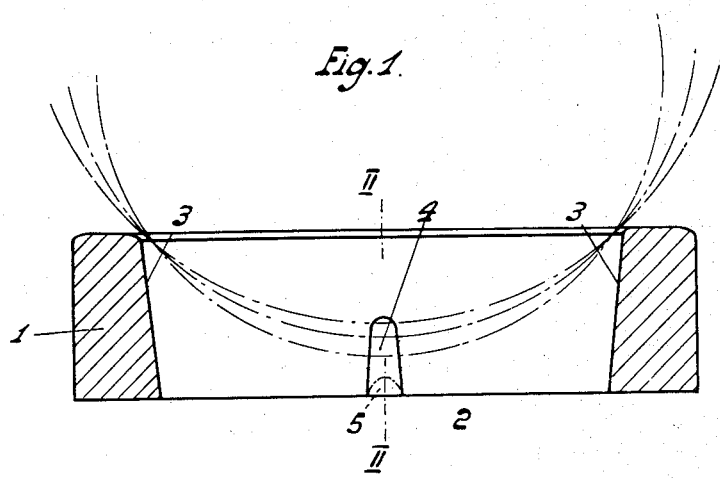
Fig. 1 is a longitudinal cross-section of the bicycle stand according to the invention.
Figure 2:
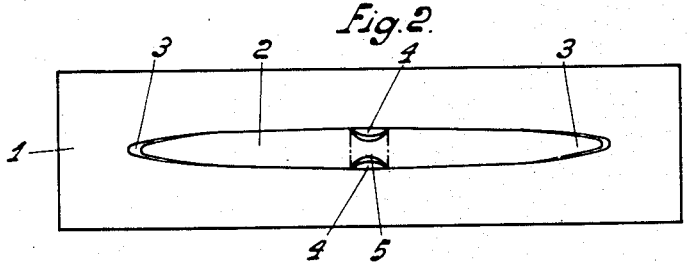
Fig. 2 is a top view.
Figure 3:
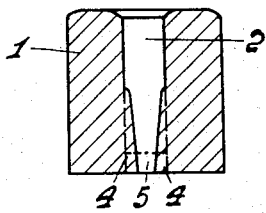
Fig. 3 is a cross-section according to line II—II in Fig. 1.

The bicycle stand consists of the block 1, made for example of reinforced concrete, supplied with the longitudinal slit 2 extending through the said block. The cross-section of slit 2 is of similar form at the top and the bottom of the block. The ends 3 of the slit are tapered toward the bottom and toward each end to a width considerably smaller than the tire width of any bicycle wheel to be placed in the stand. It is apparent that grit accumulated in the narrowest part of the slit ends 3 is no longer able to hinder the placement of the wheel-tire in the stand.

In the longitudinal centre of the slit 2 two ribs 4 with a segmental cross-section are fitted to the opposite walls of the slit 2. The said ribs 4 taper towards the upper surface of the block 1.

The ribs 4 can be supplied at their lower end with the bridge 5 shown in dash-and-dot lines.

As the slit 2 is passed through the block all grit, etc. entering said slit falls through the block and an obstruction of the slit by accumulated dirt or gravel is no longer possible.

The bicycle wheel placed into the slit 2 (see Fig. 1) and more particularly its resilient tire is clamped between the central ribs 4 and the tapered ends 3 of the slit 2, whereby the wheel is positively supported at three places and independently of the diameter of the wheel. As shown in Fig. 1 in dot and dash lines wheels of somewhat smaller diameter penetrate deeper into the slit in the middle between the ribs 4 than a wheel of larger diameter. Wheels supplied with tires of smaller width take a position in the slit deeper at all the three clamping points.

The blocks for the improved bicycle stand according to the invention are somewhat higher than those hitherto used and therefore possess a deeper slit. However, these blocks are made narrower so that their weight is not increased.

For better visibility the upper surface of the blocks can be painted red or white.

What I claim is:

1. A bicycle stand comprising a body having top and bottom faces, said body having a major axis and a minor axis, and an elongated aperture extending along said major axis, through the body from top to bottom, the end walls of said aperture being downwardly converging, and the two side walls of said aperture having two ribs, respectively, on said minor axis, extending perpendicular to said major axis toward and terminating approximately at the mid-height of the body, said ribs having rounded faces tapering from each other from the bottom toward the mid-height of the body, whereby a bicycle wheel received in said aperture is supported at the ends of the aperture and between the faces of said ribs, the relative taper of said ribs providing for the accommodation of wheels of different diameters.

2. A bicycle stand, according to claim 1, in which said end walls taper toward each other at the bottom of the block, whereby a bicycle wheel is clamped between the faces of said ribs at one point on the minor axis, and said tapered end walls at two points on the major axis.

3. A bicycle stand comprising a body of dense material having a top and a bottom face and an elongated shape, an aperture formed in said body and extending therethrough from the top face to the bottom face, said aperture having a longitudinal axis of symmetry, the side walls of said aperture in said top face defining the maximum spacing at the center of said axis and converging to the ends at both sides of the axis center, the end walls of said aperture being downwardly converging, each said side wall having a rib disposed at the longitudinal center thereof and extending from the bottom face substantially midway to the top face, said ribs diverging from each other from the bottom toward the top whereby a bicycle wheel contained in said aperture is supported at the respective converging ends and between the said ribs.

References Cited in the file of this patent

UNITED STATES PATENTS

| 351,208 | Searles | Oct. 19, 1886 |

FOREIGN PATENTS

| 888,336 | France | Sept. 6, 1943 |
| 21,802 | Great Britain | 1891 |
| 178,689 | Great Britain | Apr. 27, 1922 |
| 550,093 | Great Britain | Dec. 22, 1942 |
| 558,041 | Great Britain | Dec. 16, 1943 |